(12) United States Patent
Rodgers

(10) Patent No.: US 7,681,301 B2
(45) Date of Patent: Mar. 23, 2010

(54) RFID SILICON ANTENNA

(76) Inventor: James Neil Rodgers, 8853 214th Place, Langley, BC (CA) V1M 2H9

( * ) Notice: Subject to any disclaimer, the term of this patent is extended or adjusted under 35 U.S.C. 154(b) by 508 days.

(21) Appl. No.: 11/683,056

(22) Filed: Mar. 7, 2007

(65) Prior Publication Data
US 2008/0217560 A1 Sep. 11, 2008

(51) Int. Cl.
G06K 19/06 (2006.01)
H01P 11/00 (2006.01)
H01Q 13/00 (2006.01)

(52) U.S. Cl. .............................. 29/600; 29/601; 235/492

(58) Field of Classification Search ............. 250/492.1; 340/572.7; 438/942; 29/600, 601, 82, 827; 219/121.18; 235/491, 492; 343/895
See application file for complete search history.

(56) References Cited

U.S. PATENT DOCUMENTS

| | | | |
|---|---|---|---|
| 6,208,293 B1 | 3/2001 | Adams et al. | |
| 6,319,567 B1 * | 11/2001 | Senzaki et al. | 427/565 |
| 6,693,541 B2 * | 2/2004 | Egbert | 340/572.7 |
| 6,986,199 B2 * | 1/2006 | Arnold et al. | 29/832 |
| 7,120,550 B2 * | 10/2006 | Diorio et al. | 702/107 |
| 7,176,053 B1 | 2/2007 | Dimmler | |
| 7,365,321 B2 * | 4/2008 | Nasser-Ghodsi et al. | 250/310 |
| 7,546,671 B2 * | 6/2009 | Finn | 29/592.1 |
| 7,578,048 B2 * | 8/2009 | Wollach et al. | 29/600 |
| 2003/0006217 A1 * | 1/2003 | Dance | 219/121.18 |
| 2004/0244187 A1 * | 12/2004 | Annamaa et al. | 29/601 |
| 2005/0022374 A1 * | 2/2005 | Hirai et al. | 29/825 |
| 2005/0115056 A1 * | 6/2005 | Leisten et al. | 29/601 |
| 2005/0179552 A1 * | 8/2005 | Shoji et al. | 340/572.7 |
| 2006/0079062 A1 * | 4/2006 | Mazur et al. | 438/308 |
| 2006/0255946 A1 * | 11/2006 | Khatri | 340/572.7 |
| 2006/0262436 A1 * | 11/2006 | Shimada et al. | 359/883 |
| 2006/0270191 A1 * | 11/2006 | Tamura et al. | 438/458 |
| 2007/0094862 A1 * | 5/2007 | Posamentier | 29/601 |
| 2007/0130754 A1 * | 6/2007 | Fein | 29/600 |
| 2008/0036680 A1 * | 2/2008 | Ito et al. | 343/873 |
| 2008/0106379 A1 * | 5/2008 | Haddock | 340/10.1 |
| 2008/0315311 A1 * | 12/2008 | Okamoto | 257/347 |
| 2009/0056105 A1 * | 3/2009 | Joodaki | 29/600 |

OTHER PUBLICATIONS

Carey et al. ("Femtosecond Laser Assisted Microstructuring of Silicon Surfaces" Optics and Photonics News, Feb. 2003, pp. 32-49).*
Swamy et al. ("Manufacturing Cost Simulations for Low Cost RFID systems" White Paper, Feb. 1, 2003, Auto-ID center, MIT).*
Korte et al. ("Towards Nanostructuring with femtosecond laser pulses" Appl. Phys. A 77, 229-235 (2003)).*
Her et al. ("Microstructuring of Silicon with Femtosecond laser pulses" Appl. Phys. Lett. Vo. 73, No. 12, Sep. 21, 1998 pp. 1673-1675).*
Madou ("Fundamentals of Microfabrication: the science of miniaturization" CRC Press 2002, p. 3).*
Ameer Beg et al. ("Femtosecond laser microstructuring of materials" Appl. Surf. Sci. 127-129 (1998) 875-880).*
Lenzner et al. ("Femtosecond Optical Breakdown in Dielectrics" Phy. Rev. Lett. vol. 80, No. 18, May 4, 1998, pp. 4076-4079).*

* cited by examiner

Primary Examiner—Jack I Berman
Assistant Examiner—Brooke Purinton
(74) Attorney, Agent, or Firm—James Neil Rodgers

(57) ABSTRACT

The system of producing an RFID antenna using the silicon in an integrated circuit as the resonant antenna material for the purpose of reducing the cost of an RFID system and for the purpose of increasing the range and selectivity of the RFID system. According to this invention the base silicon sheets which make up the primary building material of the silicon chip (integrated circuit) is subjected to a laser ablation process. This creates three dimensional nano structures on the surface of the silicon thereby raising its absorption rate of electro magnetic signals. On the reverse side of the same silicon sheet a directional antenna is etched using standard photographic reduction techniques and standard semi conductor industry manufacturing methods. The two sides of the silicon are connected through doping aluminum or copper impurities into these same base silicon sheets causing conductivity within the sheet of silicon.

16 Claims, No Drawings

RFID SILICON ANTENNA

This invention has applicability in the field of radio frequency identification (hereinafter referred to as "RFID"). This invention contemplates irradiating silicon surfaces with blasts of ultra short laser pulses to change the physical properties of the silicon. The concept is to create a forest of microscopic spikes on the surface of bulk commercial silicon. The surface of silicon is usually smooth and highly reflective. The physical alteration to the surface of the silicon using laser pulses causes it to be highly absorptive of electro magnetic radiation. This invention contemplates treating commercial sheets of silicon wafers with laser ablation for the purpose of changing the physical properties of the silicon so that the silicon acts as an antenna. In so doing the cost of producing an RFID transponder is significantly reduced as the antenna and integrated circuit can be manufactured as one piece. This is in contrast to the current transponder manufacturing procedure whereby a metal antenna is separate from the integrated circuit and then needs to be attached to the integrated circuit using come sort of adhesive.

There are four basic components which comprise the current RFID transponder manufacturing process. First, there is the substrate on which the tag is assembled. This is usually a thin plastic sheet. It is flexible and uniformly smooth. This makes it amenable to a wide array of metal lithography, metal etching, metal stamping, and printing processes that can be used to manufacture the antenna.

Metal etching is the most commonly used method of creating an antenna. The antenna is the second component in the RFID manufacturing process. The antenna is used for power harvesting and communication. Metal etching works by covering the entire substrate with a thin sheet of metal. The metal used is typically copper or aluminum. The thickness of the metal is approximately 35 um. The desired antenna design is masked out of the metal and all excess metal is removed. As the process of etching is subtractive it means that complex and widespread antenna patterns require comparatively larger amounts of metal than less complex designs. The consequence is that more complex designs for a transponder antenna are more expensive than less complex designs due to the amount of removed metal during the etching process.

The third basic component of RFID manufacturing is the silicon chip which contains the functionality of the RFID system. The cost of the chip is determined by volume and chip size. High volume silicon chips have historically experienced an average total production cost of four cents per square millimeter. This includes manufacturing, wafer testing and separation costs. Chip cost is minimized by reducing the chip size. However, the chip size is directly proportional to the amount of functionality implemented on the chip. Therefore, a simple identity tag will yield the lowest cost of production.

The fourth tag manufacturing production cost is in the attachment mechanism between the antenna and the silicon chip. The chip must be securely connected to the antenna. There needs to be significant electrical connectivity to enable efficient power harvesting and communication. The chip is usually connected to the antenna with a conductive adhesive such as solder or a conductive epoxy. The most widely used manufacturing method for placing a chip on an antenna is called flip-chip assembly. This technique involves placing the silicon chip directly on the antenna. The conductive adhesive between the chip and the antenna ensures that the connection is robust.

This invention contemplates a system for creating a low cost tag which retains full functionality from the chip. These are required in the ultra high frequency spectrum which is used in the tags mandated by Wal-Mart and DOD standards. The technology of this invention involves femto second laser ablation of the surface of bulk commercial silicon sheets to produce three dimensional nano structures on the sheets. The three dimensional nano structures on the surface of the silicon sheets change it from a highly reflective surface to a highly absorptive surface in relationship to radiation in the form of electro magnetic signals. The useful, non-obvious and novel step herein is to utilize the silicon as an antenna thereby cutting out the expensive steps of tooling a metal antenna and pasting same to the silicon. In essence the silicon covering of the integrated circuit, which contains all the functionality of the transponder, also becomes the harvesting and transmitting antenna of the transponder.

Femto second direct write micro and nanostructuring laser technologies are essential for manufacturing of this type of useful, non-obvious and novel antenna. Using tightly focused femto second laser pulses a manufacturer can produce sub micrometer holes and periodic structures in semiconductors. The achievable structure size is not restricted by the diffraction limit. It is determined by material properties of the silicon and the laser pulse stability.

BACKGROUND OF THE INVENTION

Research by Kulyk and Townsend of the University of Calgary indicates that micro machined patch antennas can be manufactured to improve radiation. The technique reported by Kulyk and Townsend involves removing some of the substrate material under the radiating element. The result is that the air and substrate combination produces a lower effective dielectric constant which prevents excitation of surface waves. The result is increased radiation efficiency of the radiating element. This research was conducted on low conductivity silicon substrate. The patch antenna was designed for an operating frequency of 13.75 GHz. The frequency was selected to determine the viability of micro machined micro strip antennas for on chip fabrication. The conclusion of the research indicates that micro strip antennas fabricated on low conductivity silicon substrate show that an increase in radiation is possible. This research indicates that silicon substrate can be used in the machining process to assist in enhancing radiation levels of patch antennas. This research does not discuss enhancement of the surface of silicon by laser ablation for the purposes of increasing sensitivity to radiation in the form of electro magnetic signals. Research from The Radiation Laboratory of The University of Michigan by Gauthier, Raskin and Rebeiz describes micro machining techniques for micro strip antennas which produce fifty percent radiation efficiency for the antenna. This research indicates that the micro machining process can be used in enhancing radiation levels of antennas. This research does not discuss enhancement of the surface of silicon by laser ablation for the purposes of increasing sensitivity to radiation in the form of electro magnetic signals. U.S. Pat. No. 6,208,293 owned by Lockheed Martin Corporation contemplates a phased array antenna which is photonically controlled. The antenna elements are formed of photo conductive materials which when illuminated become conductive so that they are enabled to function as a receiving and radiating element. The activation process is by laser pulses. The antenna elements are fabricated from a photo conductive semiconductor material that becomes conductive when illuminated by a light source. When the material is activated by a laser it can serve as a metal like electromagnetic radiator and receiver. The antenna elements are fabricated from a photo-conductive material such as silicon. This patent does not discuss enhancement of the surface of silicon by laser ablation for the purposes of increasing sensitivity to radiation in the form of electro magnetic signals. U.S. Pat. No. 7,176,053 owned by OrganicID, Inc. contemplates laser ablation for the purpose of defining the channel length of an organic transistor. Claim 1 and 2 of U.S. Pat. No. 7,176,053 describe a laser ablation method but refer to a printed antenna in the RFID circuit. This patent does not discuss enhancement of the surface of silicon by laser ablation for the purposes of increasing sensitivity to radiation in the form of electro magnetic signals.

SUMMARY OF THE INVENTION

The current state of the art in the RFID industry presents two basic types of RFID transponders, or tags as they are often called. The Inductively Coupled tag is the type which has been used to track agricultural animals, airline baggage, to tally highway tolls and to locate railcars. There are three parts to the Inductively Coupled tag. First there is the silicon integrated circuit also known as a silicon microprocessor. Then there is a metal coil made of copper or aluminum wire that is wound into a circular pattern on the transponder. This metallic coil acts as the antenna for the transponder. The transponder transmits electro magnetic signals to the interrogator. Read distances vary but can be determined by the size of the coil antenna. The third piece of the Inductively Coupled tag is the encapsulating cover made usually of glass or polymer material. This cover wraps around the silicon microprocessor and the metal coil.

The Inductively Coupled tags are powered by the magnetic field generated by the interrogator. The antenna on the transponder harvests the magnetic field and communicates with the interrogator. The transponder modulates or backscatters the magnetic field to transmit data back to the interrogator. The data retrieved is then sent to a host computer for analysis. These tags are expensive on a per unit basis with prices ranging from $1 for a passive button type of tag to $200 for a battery powered, read and write transponder. The high cost for Inductively Coupled RFID tags is due to the price of silicon, the coil antenna and the laborious process that is needed to wind the coil around the surface of the tag.

According to this invention the cost of an Inductively Coupled RFID tag could be dramatically reduced. This is because this invention contemplates using the silicon alone as the antenna. This invention obviates the requirement of metal and the process of coiling.

The other type of RFID tag is the Capacitively Coupled transponder. This type of tag has been created to attempt to lower the cost of RFID systems. These types of transponders jettison the metal coil and use a small amount of silicon to perform the same function as an Inductively Coupled tag. The three parts of the Capacitively Coupled transponder are the silicon microprocessor, conductive carbon ink and paper. The silicon chip is attached to printer carbon ink electrodes on the back of a paper label. The special conductive ink acts as the antenna for the tag. It is applied to the paper substrate through a conventional printer. This process is less expensive than the Inductively Coupled technology above, however, it is less effective in the ultra high frequency bands.

According to this invention the cost of a Capacitively Coupled RFID tag could be dramatically reduced. This is because this invention contemplates using the silicon alone as the antenna. This invention obviates the requirement of the cost of conductive carbon ink. Furthermore, there are deficiencies with conductive carbon ink at the higher frequency levels, such as ultra high frequency and microwave, which have not been solved.

This invention contemplates irradiating silicon surfaces with blasts of ultra short laser pulses to change the physical properties of the silicon. The concept is to create a forest of microscopic spikes on the surface of bulk commercial silicon. The surface of silicon is usually smooth and highly reflective. The physical alteration to the surface of the silicon using laser pulses causes it to be highly absorptive of electro magnetic radiation. This invention contemplates treating commercial sheets of silicon wafers with laser ablation for the purpose of changing the physical properties of the silicon so that the silicon acts as an antenna. In so doing the cost of producing an RFID transponder is significantly reduced as the antenna and integrated circuit can be manufactured as one piece. For example, one aspect of this invention is to take ordinary commercially produced silicon wafer sheets, and subject these sheets to an intense blast of laser light. The result is a silicon structure which is usually smooth and reflective presenting with pits, globules and strands. This physical transformation dramatically increases the reflective area of the surface of the silicon wafer sheets suffering laser ablation. This has the effect of dramatically improving the ability of the silicon to capture or harvest radiation.

The laser blast or ablation causes nanostructures to form on the silicon. These nanostructures are the result of changes to the physical properties of the silicon. These changes increase the ability of the silicon to harvest or capture radiation. The more surface area available on the silicon the more surface area is available for the radiation in the form of electro magnetic signals to be absorbed into. The science in this area indicates that laser blackening of silicon increases absorption rates by at least 50%.

The process is known as a femtosecond laser pulse. The laser burst lasts only a few quadrillionths of a second. For the purposes of comparison, a femtosecond is to a second what a second is to about 32 million years. By way of further comparison during this brief burst the laser unleashes as much power as the entire grid of North America onto a spot the size of a needle point.

This invention uses three dimensional nano structuring caused by femtosecond laser pulses to increase the radioactive sensitivity of a sheet of silicon wafers designed for an RFID system whereby the silicon acts as both the microprocessor and the antenna. It is contemplated that commercial sheets of silicon wafers will be treated with femtosecond laser pulses to increase their radiation absorption rate and therefore increase their sensitivity to electro magnetic signals. The absorption rate is equivalent to the degree to which electro magnetic energy, or radiation, is captured or harvested by base antenna material.

The scientific research supports a model whereby the laser ablation process blackens the surface of silicon using a TI: Sapphire Femto-Second laser to increase electro magnetic absorption rates. Reflectance measurements are made to analyze the surface properties of the silicon wafer sheets to determine the parameters of the reflectance values. Standard scientific measuring processes are used to make this determination. Furthermore, the scientific journals reveal precise laser pulse durations to confine collateral damage on the surface of the silicon and disclose that technologies of the nonlinear multi photon laser matter interaction processes are required for proper laser ablation. The laser blast should be at a frequency equivalent to the surface charge oscillations of the silicon and can be manipulated in duration and number of laser pulses to incrementally raise absorption rates. This laser ablation process creates nano cavities, nano rims and nano protrusions on the silicon.

In a preferred embodiment the silicon wafers used for constructing the integrated circuits used in an RFID system is purchased in bulk sheets. The manufacturer of the RFID silicon wafers would use a generic laser pulse device to ablate the surface of the silicon sheets with a femtosecond of laser energy. The silicon wafers would then be used in the manufacture of an RFID integrated circuit which would not need a metal or reflective ink antenna. The antenna would be the outside edge of the silicon.

Silicon chips are small rectangle of silicon. They are usually 4 or 5 square centimeters in area. The silicon acts as a base, or substrate, upon which the chip is built. It also plays a part in the electrical operation of the device. The chip is made up of a number of layers of pure and impure silicon which are built up on one side of the silicon rectangle. The lower layers interact to form the active components which are usually transistors. The upper layers are usually wires and are known as passive components.

Pure silicon is an insulator. In the wafer manufacturing process impurities are added to silicon during a layering process. This process is known as doping. The impurities which are added increase the number of free charge carriers or charged particles that are free to move about within the silicon. The result is that the silicon becomes progressively more electrically conductive as more impurity is added; Hence the name semi conductor. The type of impurity added affects the type of charge carrier. For example, some impurities generate free electrons which are negative charge carriers. This type of silicon is known as n-Type. They are others which generate holes or space where electrons should be. These particle spaces behave as positive charge carriers and are known as p-Type. The current silicon manufacturing process uses technology referred to as "complementary metal oxide semiconductor", also know as CMOS. During the CMOS process the embedded regions of the transistor form the source and drain for electron movement. The surface layers of the silicon wafer contain diffuse ions. These regions are often made from a mixture of silicon and metal. The metal has lower resistance allowing signals to travel faster. The insulator plate which goes between the silicon and the conducting plate is made of silicon oxide, also known as glass. The conducting plate or gate itself is poly crystalline silicon or "poly". This part of the silicon is without a uniform crystal structure and can be distinguished from the silicon substrate on which the chip is placed.

The typical manufacturing process for silicon chips is to add layer upon layer of silicon with each layer comprising differing levels of electrical conductivity or circuit complexity. There are more electrically active layers which form the transistors. There are electrically passive components, for example wires, which connect transistors together. These differing layers are separated from each other by silicon oxide. Holes are made in the silicon oxide to make connections between the various layers. Furthermore, there are many wiring layers in modem chips. Traditionally, the metal used for wiring is aluminum or copper.

One of the key tools for integrated circuit manufacture is laser light. This is because lasers provide a key enabling technology for the semiconductor industry. They are used to inspect and repair the mask and wafer. Nanosecond and femtosecond diode pumped solid state lasers at 355 nm and 266 nm are used to inspect the circuits. They use repair tools which are designed to correct feature defects in the chrome absorber or quartz transmissive mask substrate patterns.

The mask (circuit) pattern is applied onto the silicon substrate layer by layer. The mask is made up of circuit features spun unto the surface of a polished silicon wafer. In layman's terms, a very complicated circuitry is drawn at a very large macro level (room size) so that minute detail can be designed into an electronic circuit. This circuit is then photographed. The photograph, instead of being enlarged as is the normal in photography, is reduced in size. It is reduced to the size of the end of a pin needle. This reduced photograph is then photo exposed on a thin layer of photosensitive polymer which becomes part of the silicon mask. In more technical language the photolithographic detailed circuit is de-magnified replicating all features of the circuit perfectly. This is then made into a master stencil mask. It is illuminated in transmission by an ultraviolet light source. There is then a complex method of developing the de-magnified photograph through a process of photoresist, stripping, etching, ion implantation and deposition. After that, photo type exposures are repeated with different mask patterns as complex chip circuitry is built up, layer by layer, on the silicon wafers. The manufacturing process achieves size reduction in the photolithography mask imaging process by a combination of reducing the wavelength of the exposure source, increasing the resolution of the magnifying lens and using phase shifting masks. Furthermore, corrective structures to the mask features can be added and the photosensitive response of the resist can be tailored.

This invention contemplates taking the technology that is currently in use in the semiconductor industry and utilizing it to construct a complex directional antenna for RFID purposes. The directional antenna, when designed, would be photographed, reduced in size, and through a process of photolithography, well known to the industry, plus deposition, etching and stripping, and then this directional antenna would be introduced onto a silicon wafer. This wafer would be the reverse side of a wafer which would have been treated by the femtosecond laser so that three dimensional nano structures on its surface would make it highly radiative.

This invention contemplates that three dimensional nano structures will be formed on the outside layer of a silicon chip. This will be accomplished through femtosecond laser ablation to commercial sheets of silicon. The outside edges of the treated silicon would then be highly receptive of electro magnetic radiation in the form of RFID electro magnetic signals. It is contemplated by this invention that these electro magnetic signals will emanate from an RFID interrogator. These treated sheets will be layered unto the circuitry of the chip as a final layer. The RFID interrogation signals would then impact the extremely detailed directional antenna etched into it making up the reverse side of the final layer of the silicon chip. This directional antenna is on the inside edge of a wafer of silicon treated with laser ablation. The other side, or outside edge, of this same wafer has the three dimensional nano structures on it. Through a wire connection the antenna circuitry communicates with the surface of the silicon through metal impurities such as copper or aluminum doped into this final layer of silicon. The directionally designed antenna then sends the electro magnetic interrogation signal to the transistors of the integrated circuit for processing. The information is then backscattered to the interrogator through the radiating properties of the outside layer of impure silicon which is now acting as an antenna due to the laser ablation process.

Therefore, this invention contemplates a system for creating a low cost transponder which retains full functionality of the integrated circuit contained within. These types of transponders are required in the ultra high frequency spectrum which is to be used for the RFID systems mandated through the adoption of Wal-Mart and DOD standards. The technology of this invention involves femto second laser ablation of the surface of bulk commercial silicon wafer sheets to produce three dimensional nano structures on one side of the silicon sheets. The three dimensional nano structures on the surface of the silicon wafer sheets change it from a highly reflective surface to a highly absorptive surface in relationship to radiation in the form of electro magnetic signals. Metal impurities of copper or aluminum doped into the outer layer of silicon wafer collect the electro magnetic RFID signal harvested by the three dimensional nano structures. The three dimensional nano structures and metal impurities are designed to resonant with the frequency of the RFID interrogation electro magnetic signal. This electro magnetic signal is the transported to the integrated circuit. The backscatter identifying data contained in the integrated circuit is then transported by copper or aluminum wire to the inside antenna layer of the last layer of silicon where it is radiated by the outside edge of the last silicon layer after receiving data through the metal connectors.

The useful, non-obvious and novel step herein is to utilize the silicon as an antenna thereby cutting out the expensive steps of tooling a metal antenna and pasting same to the silicon or by using conductive inks as an antenna. In essence the silicon covering of the integrated circuit, which contains all the functionality of the transponder, also becomes the harvesting and radiating antenna of the transponder.

I claim:

1. A method of producing a Radio Frequency Identification (RFID) antenna as an integral part of an RFID integrated circuit using silicon as antenna material thereby enabling the antenna and an RFID integrated circuit to be manufactured as one piece, said method comprising:
   providing commercially produced bulk sheets of silicon wafer base material (silicon wafers);
   femtosecond laser ablating, with a sharply focused pulse, the silicon wafers to create three dimensional nano structures out of the silicon base material;
   designing an antenna as a complex resonant antenna at a macro level and reducing it, through a process of demagnification or photographically, to a nano sized image which perfectly replicates design features of a macro level template directional antenna on a master stencil mask and, still further, forming this master stencil mask on the reverse side of silicon wafers treated with femtosecond laser ablation;
   manufacturing said femtosecond laser ablated silicon wafers so that they are manufactured into radio frequency identification antennas.

2. The method of claim 1 whereby further the femtosecond laser ablation is limited to the silicon base material which is a part of a silicon layering process involved in manufacturing an integrated circuit which silicon base material is so treated to be incorporated into one of the elements of an radio frequency identification resonant antennas harvesting system.

3. The method of claim 1 whereby further the generic laser pulse device used to treat commercially produced bulk sheets of the silicon base material is of a Ti: Sapphire Femto-Second laser type used for machining silicon surfaces.

4. Increasing the electromagnetic absorption rate of the silicon base material used in the construction of an RFID antenna through the femotosecond laser ablation method of claim 1 whereby surface roughness and micro and nano sized structures are formed on the silicon base material.

5. The method of claim 1 whereby, additionally, reflectance measurements are made of the silicon base material subsequent to the laser ablation process using ellipsometry and integrating sphere, as well as EDX, XPS, and AES techniques to analyze the surface properties of the silicon base material to determine the parameters of the reflectance values of the laser machined silicon base material to verify the presence of sufficient three dimensional nano structures to adequately increase the radioactive sensitivity of the antenna.

6. The method of claim 1 whereby further the femtosecond laser pulses of high intensity light are less than a picosecond but long enough duration in femtoseconds to reach an ablation threshold yet short enough to confine collateral damage on the base silicon material to less than 10 nano meters to ensure the structural integrity of the silicon base material.

7. Further to the method of claim 1 overcoming a diffraction limit for the purpose of fabricating three dimensional nano structures on the base silicon materials by using the femtosecond laser pulses that emanates from nonlinear photon laser interaction processes.

8. The method of claim 1 whereby further the femtosecond laser pulse is unleashed at a frequency which equals a frequency of surface charge oscillations on the base silicon material thereby increasing absorption of the laser pulse.

9. Applying the femtosecond laser ablation method of claim 1 at a sufficiently high fluence and with a multitude of applied pulses for the purpose of raising the absorption rate incrementally from 50% to 100% on the base silicon materials.

10. The method of claim 1 whereby further the three dimensional nano structures are developed from a process of a nano scale melt to relocate the base silicon material from the center of the melted site to peripheral areas resulting in nano cavities, nano rims, and nano protrusions and raising the electromagnetic signal absorption rate on the base silicon materials.

11. The method of claim 1 whereby further an optimally functional RFID antenna is designed at a macro level to be a resonant match to the RFID system for which it is planned for use and still further cutting this macro level template antenna to general direction and a specific resonant frequency of the host RFID system.

12. The method of claim 1 whereby further the details of the macro level template antenna design are photo exposed to a thin layer of photosensitive polymer which is part of the surface of a polished silicon wafer.

13. The method of claim 1 whereby further the details of design are demagnified or reduced photographically to an image which perfectly replicates the design features of the macro level template directional antenna on a master stencil mask.

14. The method system of claim 1 whereby further the master stencil mask is applied to the reverse side of base silicon building material outlined in claim 1.

15. The method of claim 14 whereby further the master stencil mask and three dimensional nano structures which are manufactured into either side of one sheet of bulk commercial silicon wafer base material are cut using normal semiconductor industry methods into individual wafers.

16. The method of producing a Radio Frequency Identification (RFID) antenna as an integral part of an RFID integrated circuit using silicon as antenna material thereby enabling the antenna and integrated circuit to be manufactured as one piece, said method comprising:

providing commercially produced bulk sheets of silicon wafer base material (silicon wafers);

femtosecond laser ablating, with a sharply focused pulse, the silicon wafers to create three dimensional nano structures out of the silicon base material;

designing the antenna as a complex resonant antenna at a macro level and reducing it through a process of de-magnification or photographically to a nano sized image which perfectly replicates design features of a macro level template directional antenna on a master stencil mask and, still further, forming this structure on the reverse side of silicon wafers treated with femtosecond laser ablation;

manufacturing said femtosecond laser ablation silicon wafers into radio frequency identification antennas and whereby the individual wafers are applied, using standard semiconductor industry layering method, onto a semiconductor to be used in an RFID system.

* * * * *